(12) United States Patent
Kroon et al.

(10) Patent No.: US 6,250,476 B1
(45) Date of Patent: *Jun. 26, 2001

(54) MUNICIPAL WASTE SEPARATOR

(75) Inventors: Scott M. Kroon, Orchard Park; John J. Bakula, Grand Island, both of NY (US)

(73) Assignee: Derrick Manufacturing Corporation, Buffalo, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/286,207

(22) Filed: Apr. 5, 1999

Related U.S. Application Data

(63) Continuation-in-part of application No. 08/661,395, filed on Jun. 7, 1996, now Pat. No. 5,921,399.

(51) Int. Cl.[7] ...................................................... B07B 1/10
(52) U.S. Cl. ........................ 209/272; 209/307; 209/380; 209/390; 210/396; 210/400; 210/783
(58) Field of Search .................................. 209/268, 269, 209/272, 307, 379, 380, 385, 386, 389, 390, 930; 210/396, 400, 401, 783

(56) References Cited

U.S. PATENT DOCUMENTS

| | | | |
|---|---|---|---|
| 985,809 | * 3/1911 | Hoyt | 209/272 |
| 2,408,191 | * 9/1946 | Barnett et al. | 209/272 X |
| 4,350,591 | 9/1982 | Lee | 210/384 |
| 5,921,399 | 7/1999 | Bakula et al. | 209/272 |

FOREIGN PATENT DOCUMENTS 9312321   6/1993   (WO).

\* cited by examiner

*Primary Examiner*—Tuan N. Nguyen
(74) *Attorney, Agent, or Firm*—Conley, Rose & Tayon, P.C.

(57) ABSTRACT

A separator includes a continuous inclined screening belt that passes over an upper roller and a lower roller to screen debris from municipal wastewater. The debris is then conveyed to a debris discharge outlet. A puddle of debris-laden wastewater forms a hydrostatic pressure head on the upper surface of the screening belt to assist in forcing the wastewater through the screening belt. Wastewater that passes through apertures in the screening belt is deflected by a deflector plate that shields the return path of the screening belt. The screened wastewater is then directed to the wastewater outlet. In a preferred embodiment, a belt-cleaning brush is disposed along the return path and brushes clinging debris from the screening belt toward the debris discharge outlet. Additionally, the screening belt rides on and is supported by a perforated backing plate as it travels from the lower roller to the upper roller. Overflow ports are provided to allow wastewater from the puddle to bypass the screening belt if the screening belt becomes blinded. This prevents the wastewater from exiting the separator via the debris discharge port.

19 Claims, 5 Drawing Sheets

MUNICIPAL WASTE SEPARATOR

RELATED APPLICATION

This application is a continuation-in-part of U.S. patent application No. 08/661,395, filed Jun. 7, 1996, now U.S. Pat. No. 5,921,399 and titled "Debris Separator" by inventors John J. Bakula and Scott M. Kroon. The referred-to application is incorporated by reference.

FIELD OF THE INVENTION

This invention relates generally to apparatus and methods for separating solid particles form fluids or fluid slurries and more particularly to apparatus and methods for cleaning waste water by removing suspended solids.

BACKGROUND OF THE INVENTION

Municipal wastewater is the flow of used water from a community. Although the characteristics of the wastewater vary from location to location depending on various factors, municipal waste water is typically considered as a mixture of storm water and sanitary wastewater. Storm water is runoff from precipitation, and accordingly, reflects the composition of the precipitation and the surfaces with which it comes into contact. Sanitary wastewater is a combination of domestic wastewater and other wastewater such as that discharged form commercial, institutional, and other such facilities. Domestic wastewater includes typical wastes form the kitchen, bathroom and laundry, as well as any other wastes that people may accidentally or intentionally pour down the drain.

The purpose of municipal wastewater treatment is to strip large volumes of wastewater of as much of its harmful elements as possible before releasing it to the receiving environment. Wastewater processing for large municipalities is typically divided into stages: pre-treatment, primary treatment, secondary treatment, tertiary treatment, and additional treatment. Pretreatment comprises screening the municipal wastewater to remove large solid debris such as gravel, wood, plastic and other miscellaneous trash from the wastewater. This step prevents the debris form damaging or interfering with the operation of the downstream equipment. This debris may be disposed of in a landfill or ground up and recycled.

Primary treatment involves encouraging sedimentation by slowing the flow rate of the wastewater and allowing the larger suspended particles to settle naturally due to gravity. This permits floating solids, oils, and greases o be skimmed off the surface. The sedimented contaminants (often referred to as "sludge") may be disposed of in a variety of ways, or "activated" and used as fertilizer. Secondary treatment involves aeration of the wastewater to encourage bacteria and other micro-organisms to grow and consume dissolved organic matter. A second sedimentation step with the addition of a metal salt solution may be employed to remove phosphorus and more of the suspended particles. Chlorine or ozone may also be added to kill harmful micro-organisms. Tertiary treatment employs sand filtration or mechanical filtration to further reduce the suspended particle concentration. Additional treatment such as nutrient removal and dechlorination of the wastewater may be performed subsequent to this step. Although the cleanest water is obtained using the tertiary and additional treatment stages, they are not performed by all wastewater treatment facilities.

In general, screening solid particles from fluid streams by passing a fluid through a screen or sieve having perforations of such size the solid particles are retained on the screen surface instead of passing through is well known. In the municipal wastewater pretreatment process however, it is not simply a matter of passing solid particles carried in a fluid stream across a screening device to obtain a separation. The nature of the carried-along debris may often cause blinding of the filter screen. "Blinding" is the clogging of the screens and the reduction of their open area. Further, much of the debris, such as plastic bags, rags, and string, does not lend itself to vibratory screening methods.

Consequently, the debris tends to reduce the capacity of municipal waste separation equipment by clogging the screens and reducing their open area. As more wastewater is received for processing, the debris tends to accumulate in the screening equipment. This obviously further reduces the ability of the screening equipment to screen the wastewater. Eventually, this accumulation threatens the ability of the equipment to effectively screen the wastewater and may even force an overflow or bypass of the pretreatment stage, with detrimental effects on downstream equipment. This undesirable accumulation may result in system shutdown or the need for extra equipment.

Wastewater treatment is essential to the health of the community and the environment. Unless it can be done efficiently, the cost of wastewater treatment may result in higher taxes or increased pollution. Screening equipment which operates efficiently and reliably can reduce the cost of the pre-treatment stage and thereby free up revenue for tertiary treatment or other additional treatment stages which reduce pollution.

SUMMARY OF THE INVENTION

Accordingly, there is provided herein a municipal waste separator comprising a vessel which is roughly rectangular in plan, having side plates, a back plate, and an open base upon which the vessel rests. The vessel has a fluid inlet port through which debris-laden municipal wastewater passes, a wastewater outlet through which screened municipal wastewater passes, and a debris discharge outlet through which the debris and large particles screened from the municipal wastewater pass for disposal. The separator includes a continuous inclined screening belt which passes over an upper roller and a lower roller to screen the debris from the municipal wastewater and convey it to the debris discharge outlet. A puddle of debris-laden wastewater is encouraged to form to provide a hydrostatic pressure head on the upper surface of the screening belt to assist in forcing the wastewater through the screening belt. Wastewater which passes through the apertures in the screening belt is deflected by a deflector plate which shields the return path of the screening belt. The screened wastewater is then directed to the wastewater outlet.

In a preferred embodiment, a belt-cleaning brush disposed along the return path brushes clinging debris from the screening belt toward the debris discharge outlet. Additionally, the screening belt rides on and is supported by a perforated backing plate as it travels from the lower roller to the upper roller. Overflow ports are provided to allow wastewater from the puddle to bypass the screening belt if the screening belt becomes blinded. This prevents the wastewater from exiting the separator via the debris discharge port.

The screening belt preferably includes a backing belt which provides low sliding friction and excellent wear resistance, and one or more fine screens mounted on the backing belt. Any one of the fine screens may be easily replaced in the event of damage. The fine screens separate particles larger than the aperture size from the incoming wastewater, and the wastewater that passes through the apertures is directed through the wastewater outlet for further cleaning.

In one specific embodiment, a secondary screening belt is disposed so as to catch debris conveyed by he primary screening belt. This secondary screening belt conveys the debris through a press roller, whereby the excess water is removed from the debris.

Important features of the present invention have been broadly summarized above in order that the following detailed description thereof may be better understood, and in order that the contribution to he art may be better appreciated. There are, of course, many additional features of the present invention that will be described in detail hereinafter and which will form the subject of the claims appended hereto.

BRIEF DESCRIPTION OF THE DRAWINGS

The following is a brief description of the drawings of the present invention wherein like elements have been identified by like numerals.

DETAILED DESCRIPTION OF THE PREFERRED EMBODIMENTS

Although the present invention is described herein with respect to the particular application of separating debris from municipal waste water, it will be recognized by one skilled in the art that other applications of the invention, such as in the mining and mineral and ore processing arts, are within the scope of the invention. The description that follows is intended to apply fully to any such applications and uses requiring the separation of liquid-solid mixtures.

Figure 1:
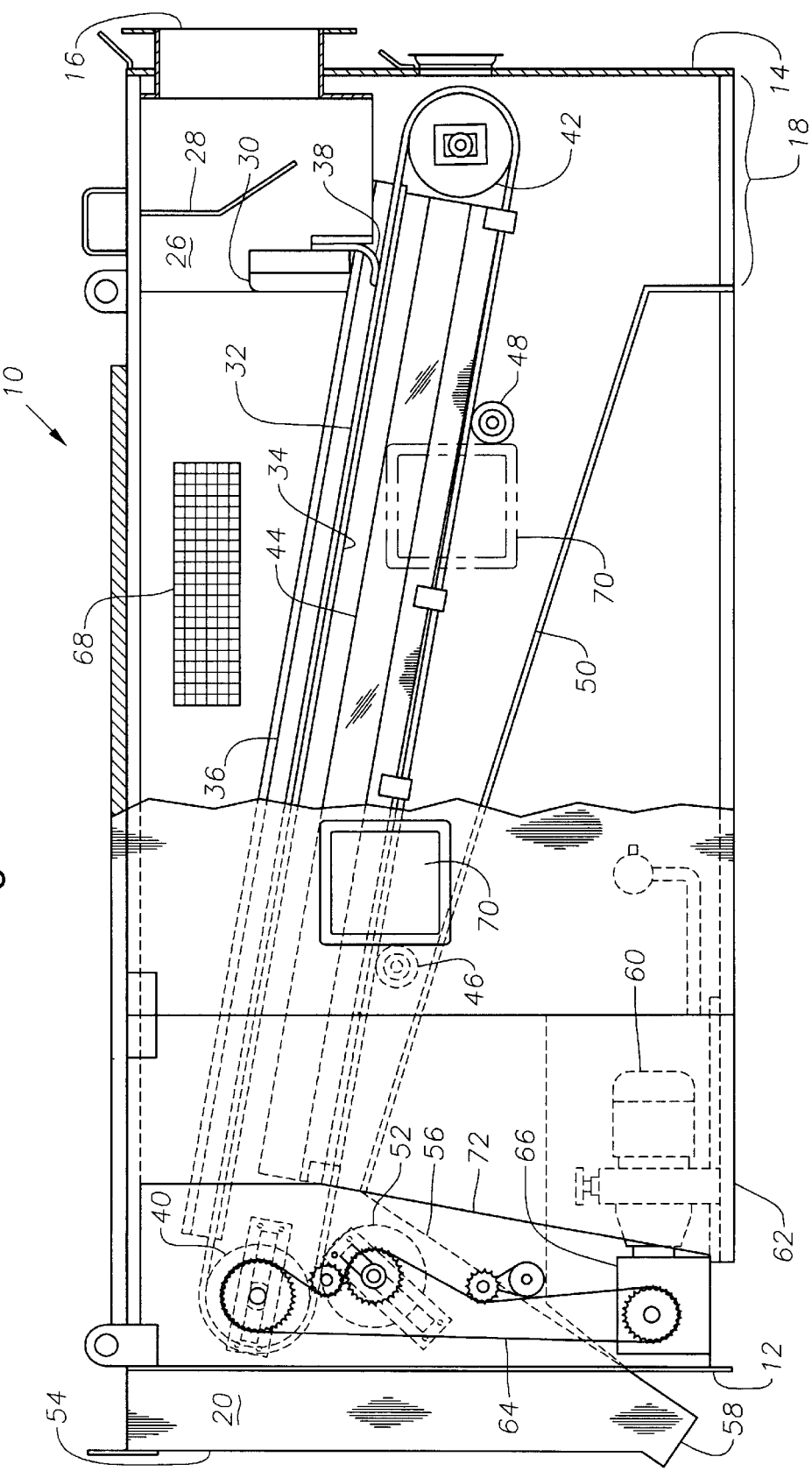
FIG. 1 shows a cross sectional view taken through the side of a municipal waste separator in accordance with a first embodiment of the present invention.
Figure 2:
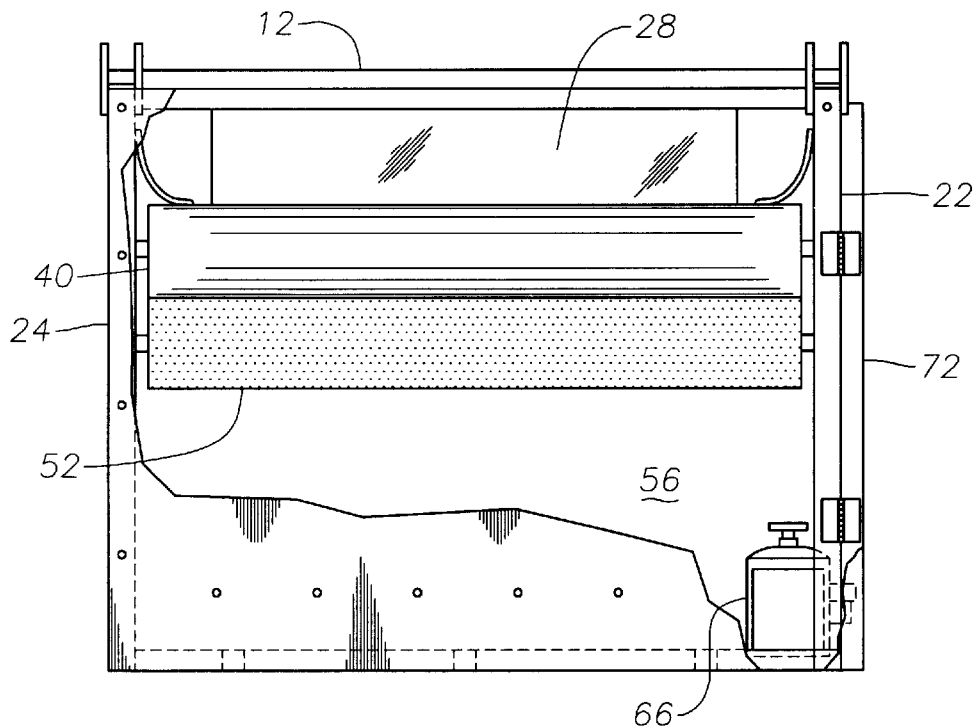
FIG. 2 shows a first end view of the municipal waste separator of FIG. 1, showing selected components.
Figure 3:
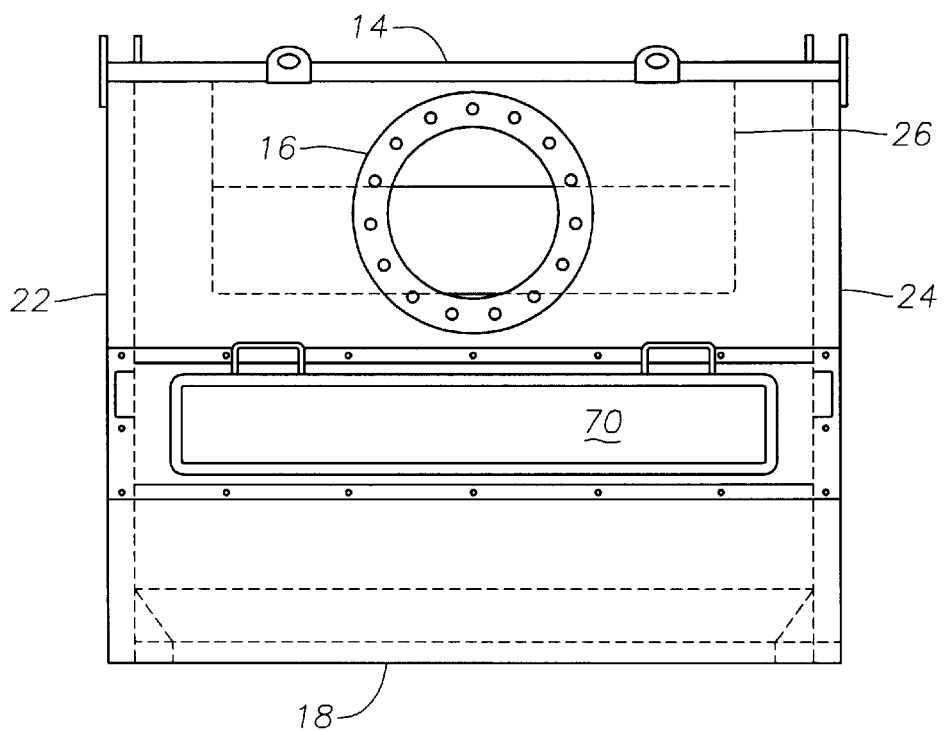
FIG. 3 shows a second end view of the municipal waste separator of FIG. 1, showing selected components.
Figure 4:
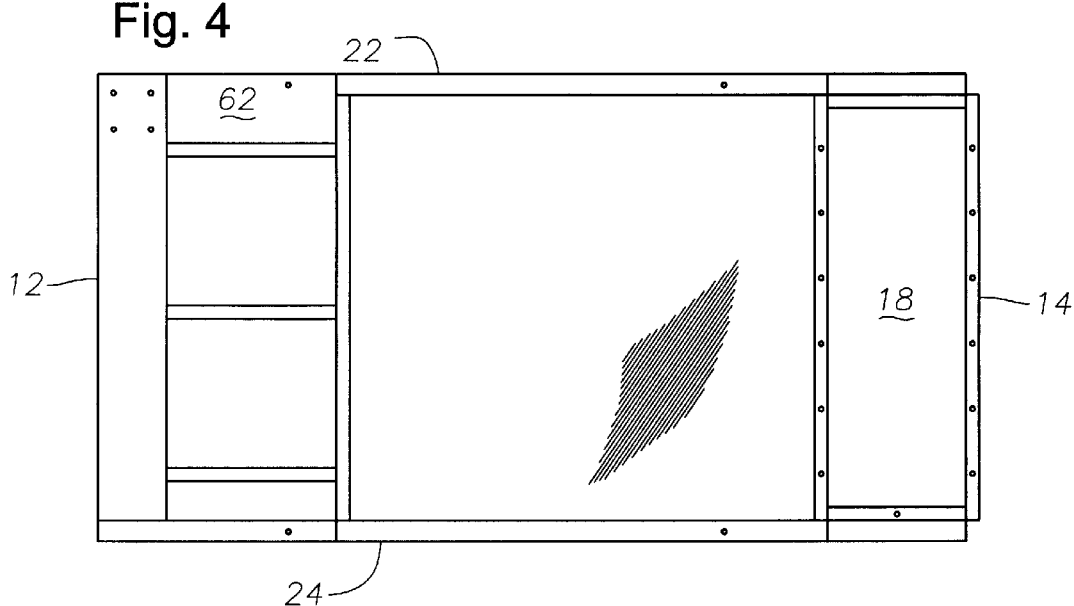
FIG. 4 shows a bottom view of the municipal waste separator of FIG. 1, showing mounting hole patterns.

Referring now to FIGS. 1–4, there is shown a first embodiment of a municipal waste separator 10 according to the present invention. FIG. 1 is a side view, FIGS. 2 and 3 are front and back views, respectively, and FIG. 4 is a bottom view. Municipal waste separator 10 is preferably constructed as a square-framed vessel of horizontal plan with a first end 12 and a second end 14, and having an inlet pipe 16 and a discharge port 18 located at the second end 14, and a debris outlet 20 at first end 12. The sides of municipal waste separator 10 are formed by (near) side plate 22 and (far) side plate 24 (labeled in FIGS. 2–4).

The inlet pipe 16 is connected to a weir feeder 26 mounted between side plates 22, 24 at second end 14 to supply the feeder with an inlet fluid stream comprising water, municipal waste, and debris. The weir feeder 26 includes a wave plate 28 and a weir 30. Wave plate 28 suppresses ripples and waves in the fluid stream so that the fluid stream flows smoothly over weir 30.

Mounted between side plates 22, 24 and disposed below the wire feeder 26 to receive the fluid stream is a conveyor bed assembly. The conveyor bed assembly comprises a continuous screening belt 32, perforated backing plate 34, side walls 36, and puddle wall 38. Perforated backing plate 34 is inclined at an angle between 0 and 20 degrees, and preferably at an angle of about 10 degrees. An upper roller 40 and a lower roller 42 are disposed at the upper and lower ends, respectively, of perforated backing plate 34. Screening belt 32 rides upward along the top surface of backing plate 34, and returns around upper roller 40 and lower roller 42. The return path of the screening belt 32 is protected by a deflector shield 44, and the returning portion of screening belt 32 may be supported by support rollers 46 and 48. Support rollers 46, 48 serve to relieve excess tension in the screening belt 32 and reduce belt stretch.

Puddle wall 38 forms a retaining wall between the bottom of the wire feeder 26 and the conveyor belt 32, and extends along the width of the perforated backing plate 34. In conjunction with side walls 36, the puddle wall 38 prevents the fluid stream from passing around screening belt 32 and thereby avoiding the screening process. The puddle wall 38 includes a rubber puddle seal which rides on the screening belt 32 to form a light seal with the screening belt 32. The puddle seal may be constructed of any flexible rubber such as nitride (buna-N), as is known in the art, so that the seal between he screening belt 32 and the puddle wall 38 is substantially sufficient to prevent fluids from flowing back down screen belt 32 during operation.

The puddle wall 38 and the side walls 36 assist in the formation of a puddle of fluid on the screening belt 32, whereby a pressure head is exerted on the fluid at the bottom of the puddle and adjacent to the screening belt 32. The fluid stream, along with those particles small enough to pass through openings in the screening belt 32, is directed through the belt 32 and the perforated backing plate 34. The screened fluid stream then passes over deflector plate 44 and down discharge incline 50 to discharge port 18. The screened fluid steam containing only wastewater with small suspended particles and dissolved materials then passes to downstream equipment for further treatment.

Discharge inlcine 50 preferably extends from just below the form end of deflector plate 44 the base of the first end 14 of municipal waste separator 0. The angle of discharge incline 50 is sufficient to cause municipal wastewater falling on it to flow freely along it and out of the municipal waste separator 10 through discharge port 18.

Any debris and particles too large to pass through screening belt 32 is conveyed up over upper roller 40 to debris outlet 20. Any particles clinging to belt 32 after it passes over roller 40 are brushed away by brush 52. Belt cleaning rush 52 is preferably disposed adjacent to the first end 12 near the debris outlet 20, and below upper roller 40, to brush any debris particles retained on the surface of screening belt 32 into the debris outlet 20. Belt cleaning brush 52 is preferably a roughly cylindrical brush with relatively stiff bristles which brush the surface of screening belt 32 during operation. The bristles may comprise a metallic wire, a suitably stiff plastic (such as nylon), or natural fibers.

Alternatively, belt cleaning brush 52 may be generally cylindrical with either longitudinal or spiral paddles extending from its surface.

The debris and large particles are directed by a splash guard 54 and debris incline 56 to a debris discharge port 58. The debris discharge port passes the separated debris and large particles to disposal. The debris incline 56 preferably extends from just below the front end of deflector plate 44 to first end 12 at a sufficiently steep angle that any debris falling to will continue to slide out of the municipal waste separator through the debris discharge port 58. Debris incline 56 and discharge incline 50 are sealed (e.g. by welding) to each other and to the side plates 22, 24 of municipal waste separator 10 such that the space thus created under the inclines remains relatively dry and free of fluid. A motor assembly is preferably disposed beneath the inclines 50, 56.

In the event of a malfunction or blinding of the screen, the fluid stream may be directed through overflow discharge vents 68 provided in the side plates 22, 24. In this manner, the fluid stream may be prevented from exiting the separator 10 via the debris discharge port 58.

A motor assembly is mounted on a bottom plate 62 and configured to drive a chain 64. The motor assembly preferably comprises an electrical motor 60, and a variable speed gear reducer 66. The chain 64 preferably runs continuously between toothed gears on reducer 66 to toothed gears on upper roller 40 to positively drive upper roller 40 and brush 52. Upper roller 40 drives and tensions screen belt 32 in conjunction with lower roller 42. Belt cleaning brush 52 preferably rotates in a direction which opposes the direction of motion of screening belt 32, preferably with a bristle-tip velocity of approximately twice the velocity of screening belt 32. If the outside diameter of cleaning brush 52 is approximately equal to that of the upper roller 40, then cleaning brush 52 preferably rotates at about twice the rate of the upper roller 40.

The motor 60 is preferably capable of moving screening belt 32 at a linear velocity of approximately 1440 inches per minute. Depending on the flow rate of the inlet fluid stream, the speed of screen belt 32 may be varied from about 500 inches per minute to about 3000 inches per minute. A three-phase electric motor rated at one horsepower is expected to be satisfactory for operation of a municipal waste separator 10 as described herein having a capacity of approximately 1100 gallons per minute of municipal wastewater.

Access covers 70 may be provided at various strategic points on the exterior of separator 10 to permit easy access to the interior. In particular, a guard door 72 is preferably provided over the toothed gears and drive chain 64 to allow easy maintenance of the drive train.

FIG. 2 shows a first end 12 side view of municipal waste separator 10. The splash guard 54 is removed to permit illustration of the interior. The surface of debris incline 56 is preferably comprised of a sheet of ultra-high molecular weight (UHMW) material such as polyethylene or other such slippery material over which debris slides freely and which may be bolted to the debris incline 56. Other materials such as stainless steel or aluminum may also be used in the construction of debris incline 56.

Figure 5:
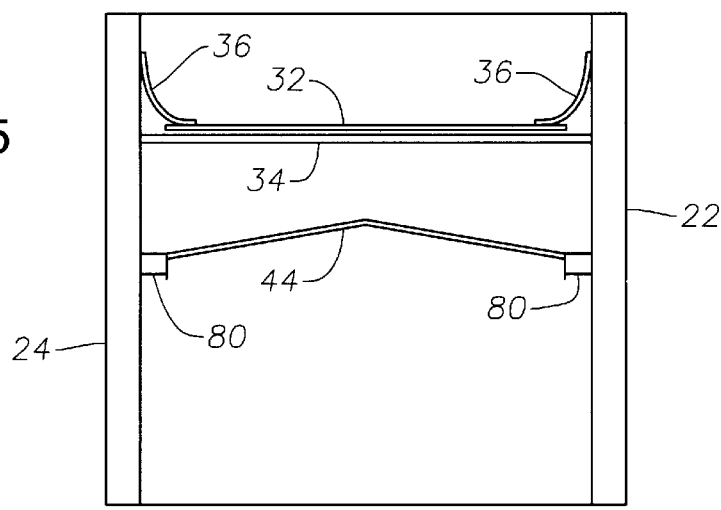
FIG. 5 shows a schematic cross-section of municipal waste separator 10.

FIG. 5 is a schematic cross-section of municipal waste separator 10, showing the configuration of the conveyor bed and the relative geometry of deflector plate 44. The side walls 36 are attached to the side plates 22, 24, and ride against the top surface of screening belt 32 to substantially prevent fluids from feeder 26 from escaping around the screening belt 32. The side walls are preferably made of flexible rubber, and are mounted to the side plates with mounting brackets along their upper edge.

Deflector plate 44 is disposed below perforated backing plate 34 and preferably along the length of perforated backing plate 34 from the lower roller 42 to the debris incline 56 to prevent the screened fluid stream from collecting on the underside of screening belt 32. Deflector plate 44 is preferably peak-shaped, and may be formed from a sheet of steel or other material by bending the sheet at its centerline and along its length to form an angle of approximately 163 degrees. The bending angle of deflector plate 44 is not critical and may be any angle providing only that fluids will flow freely down its sides. The deflector plate 44 is mounted to the side plates 22, 23 by mounting angles 80 to provide between the side plates 22, 24 and the deflector plate 44 space through which the screened fluid stream may pass. Enough mounting angles 80 are employed to secure the deflector plate 44 firmly in place.

Figure 6:
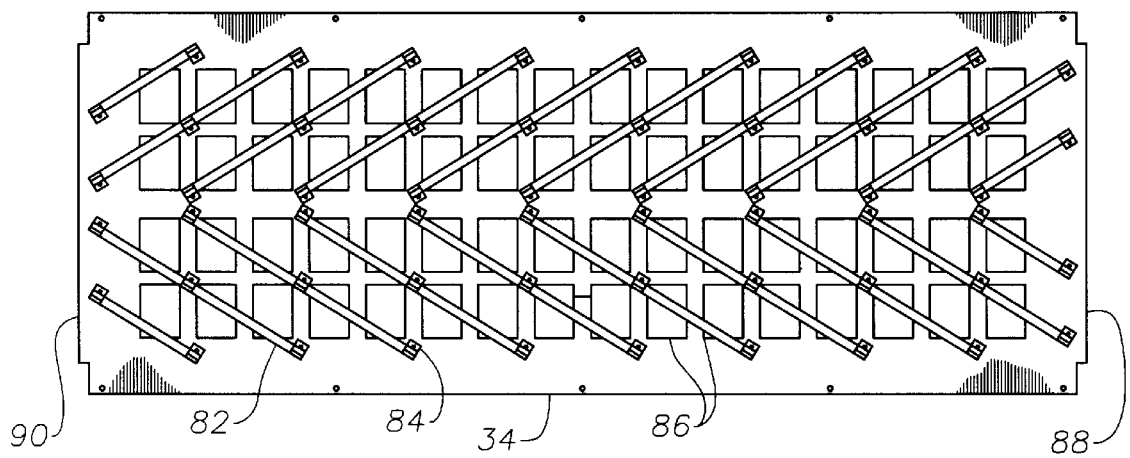
FIG. 6 shows a top view of a perforated backing plate with mounted slider bars.

FIG. 6 shows a preferred configuration of perforated backing plate 34. Perforated backing plate 34 is provided with an arrangement of rectangular performations 86 overlaid by slider bars 82. The perforations are provided to allow the municipal waste water screened by the screening belt 32 to fall through the backing plate 34. Although various perforation configurations are possible, the use of 3 inch by 5 inch rectangular perforations is currently preferred. Whichever configuration is chosen, the open are of perforated plate 34 should be sufficient for the desired capacity of the municipal waste separator 10, and sufficient support should be provided for screening belt 32 and the fluids resting on it.

Backing plate 34 has a lower end 88 near the lower roller 42 and an upper end 90 near the upper roller 40. Slider bars 82 are angled to support belt 32 while providing uniform wear on belt 32 and slider bars 82. The slider bars 82 are mounted on the backing plate 34 by ties 84. Slider bars 82 advantageously separate belt 32 from the backing plate 34 to ease the flow of waste water trough the belt 32.

The slider bars 82 are preferably constructed of ultra high molecular weight ("UHMW") polethylene but may also be constructed of other materials, like stainless steel, or aluminum. The backing plate 34 is preferably constructed of stainless steel but may also be constructed of other materials, such as UHMW or aluminum. The use of UHMW polyethylene for the slider bar 82 provides satisfactory slickness and wear resistance for screening belt 32. The perforated backing plate 34 is preferably supported by, and bolted to, a plurality of support angles which run transversely across and underneath perforated backing plate 34. The support angles may be firmly affixed to the side plates 22, 24. The slider bars 82 are preferably replaceable, whereby the life-span of the perforated backing plate 34 is extended.

Figure 7:
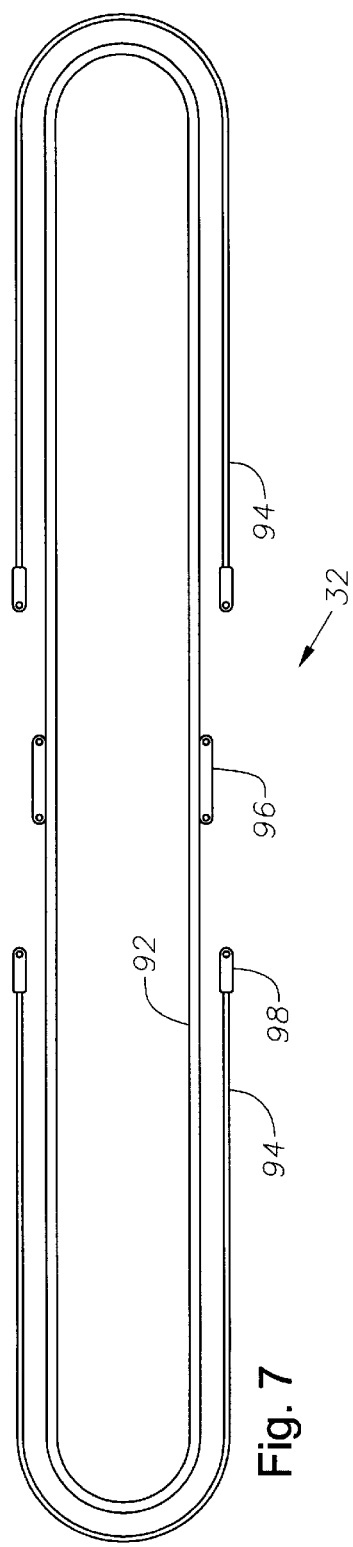
FIG. 7 shows the components of a double layer filter belt.

FIG. 7 shows a preferred embodiment of screening belt 32. Screening belt 32 preferably comprises a backing belt 92 which supports and carries one or more fine screens 94 that are attached to the backing belt at each end by attachment seams 96, 98. Backing belt 92 preferably is a metal chain belt, i.e. the belt consists of a chain of wide metal links. Since the fine screens 94 are supported by the backing belt 92, the fine screens 94 are subject to less wear from fixed surfaces such as the baking plate 34. Accordingly, the fine screens 94 may be formed from less expensive materials or formed with smaller apertures than would otherwise be possible. Additionally, the rigidity of the backing belt structure (across the width of the belt) largely eliminates wandering of the screening belt 32, thereby eliminating tracking issues. Upper and lower rollers 40, 42 may be provided with teeth that engage the backing belt to prevent slippage and further assure belt alignment. Build-up of material on the teeth is expected to be negligible relative to the build-up commonly experienced on cylindrical rollers.

The fine screens are preferably constructed of polyester, nylon, polyethylene, polypropylene, or other materials as are known in the art. The mesh size of the fine screens is preferably about 10 (i.e. roughly 10 openings per inch) but mesh sizes from about 5 to 40 may also be used. The thickness of fine screen is preferably about 0.1 inches, and the width is preferably about 28 inches, although other dimensions are also contemplated. It is noted that since the fine screens 94 may be vulnerable to damage, the use of multiple fine screens is advantageous in that repair can be achieved by replacing only the damaged screen. The remaining screens need not be replaced. This is expected to reduce the maintenance costs for the municipal waste separator 10.

Figure 8A:
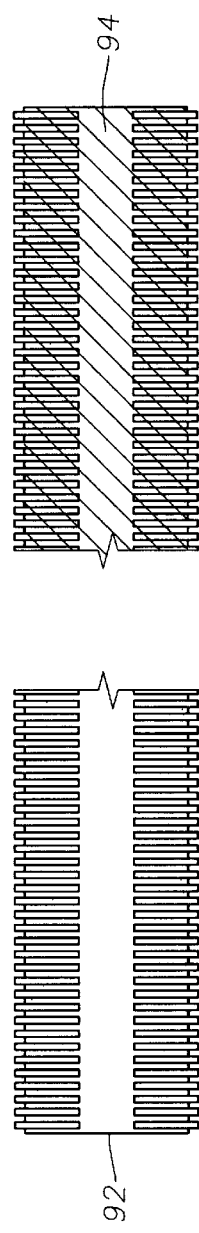
FIG. 8 shows one attachment seam embodiment which may be used for the double layer filter belt.
Figure 8B:
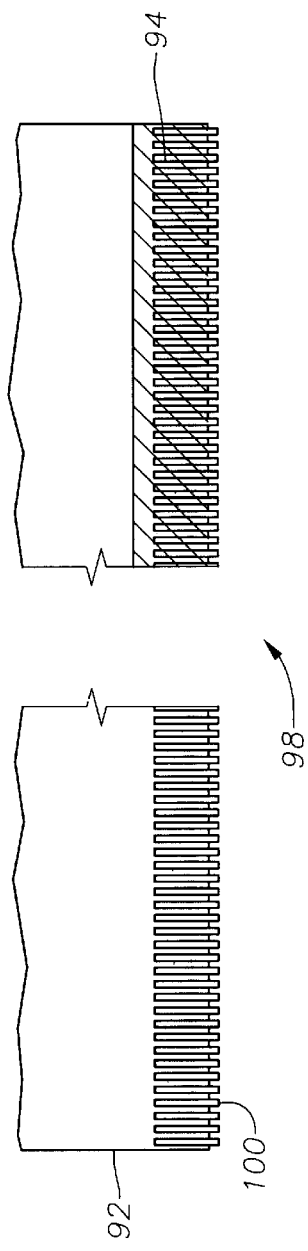

FIG. 8 shows one embodiment of attachment seam 96, which may be constructed in the following manner. A flexible plastic is cast into a short, full-width section of fine screen 94. Two parallel rows of open links 100 are attached to opposite edges along the width of the fine screen section, and spaced apart so that they may be interlaced by corresponding links from the fine screen attachment seam 98. The attachment seam 96 may be secured to the backing belt 92 by rivets or other suitable means to form a permanent seam arrangement. One suitable flexible plastic material for making the seam is polytherm.

Fine screen attachment seam 98 (FIG. 7) is similarly made by casting a flexible plastic into each end of fine screen 94. A row of open links 100 are then attached along the width of each end of fine screen 94, spaced apart so as to interlace with the open lines of attachment seam 96. When the row of links 100 from a fine screen attachment seam 98 is interlaced with a row of links from the backing belt attachment seam 96, the seam may be secured by running a metal rod through the interlaced links 100 and placing a bend in the ends of the rod to secure the rod.

Referring back to FIG. 1, when placing the municipal waste separator 10 into operation, the motor assembly is engaged at a speed which is appropriate for the debris content of the entering wastewater. The debris-laden municipal waste water enters the municipal waste separator through inlet pipe 16 and feeder 26. Motor 60 drives the upper roller 40 via the gear and chain arrangement described above, which causes the screening belt 32 to move smoothly in a generally counter-clockwise direction with reference to FIG. 1. Generally a screening belt speed of 1440 inches per minute will be sufficient, although higher and lower speeds may be supported. Screening belt 32 rides on, and is supported by, perforated backing plate 34.

The entering municipal wastewater falls from feed 26 to the upper surface of screening belt 32. The liquid and very fine particles of the municipal wastewater pass through the opening of screening belt 32, and subsequently also pass through the perforations in perforated backing plate 34, are diverted from he underside of screening belt 32, and flow down discharge incline 50 to discharge outlet 18. The very fine particles which pass through the screening belt 32 are carried along with the fluids through the discharge outlet 18. These may be subsequently removed from the municipal wastewater by subsequent wastewater treatment steps downstream.

Some of the entering wastewater is retained for a period of time as a puddle on the top surface of screening belt 32 by the puddle wall 38 and side walls 36. The weight of this puddle adds to the pressure on the municipal wastewater close the apertures in screening belt 32 by creating a hydrostatic head of fluid above the screening belt 32. The increased pressure assists in forcing the wastewater through the screening belt 32.

The debris is conveyed up the inclined screening belt 32 towards upper roller 40, allowing excess wastewater to drain from the debris. As the screening belt passes around upper roller 40, most of the debris conveyed by the screening belt 32 exits the municipal waste separator 10 through the debris outlet 20. Any debris which clings to screening belt 32 is removed by the counter-rotating belt cleaning brush 52. Debris which finds its way to debris discharge incline 56 or splash guard 54 will slide down into the debris discharge port. Debris discharge incline 56 extends up close to the return path of screening belt 32 to prevent debris from moving in the direction of the wastewater discharge port 18. The screening belt travels around lower roller 42 and returns to the area below the feeder 26 through which inlet fluids continuously pass into municipal waste separator 10.

Figure 9:
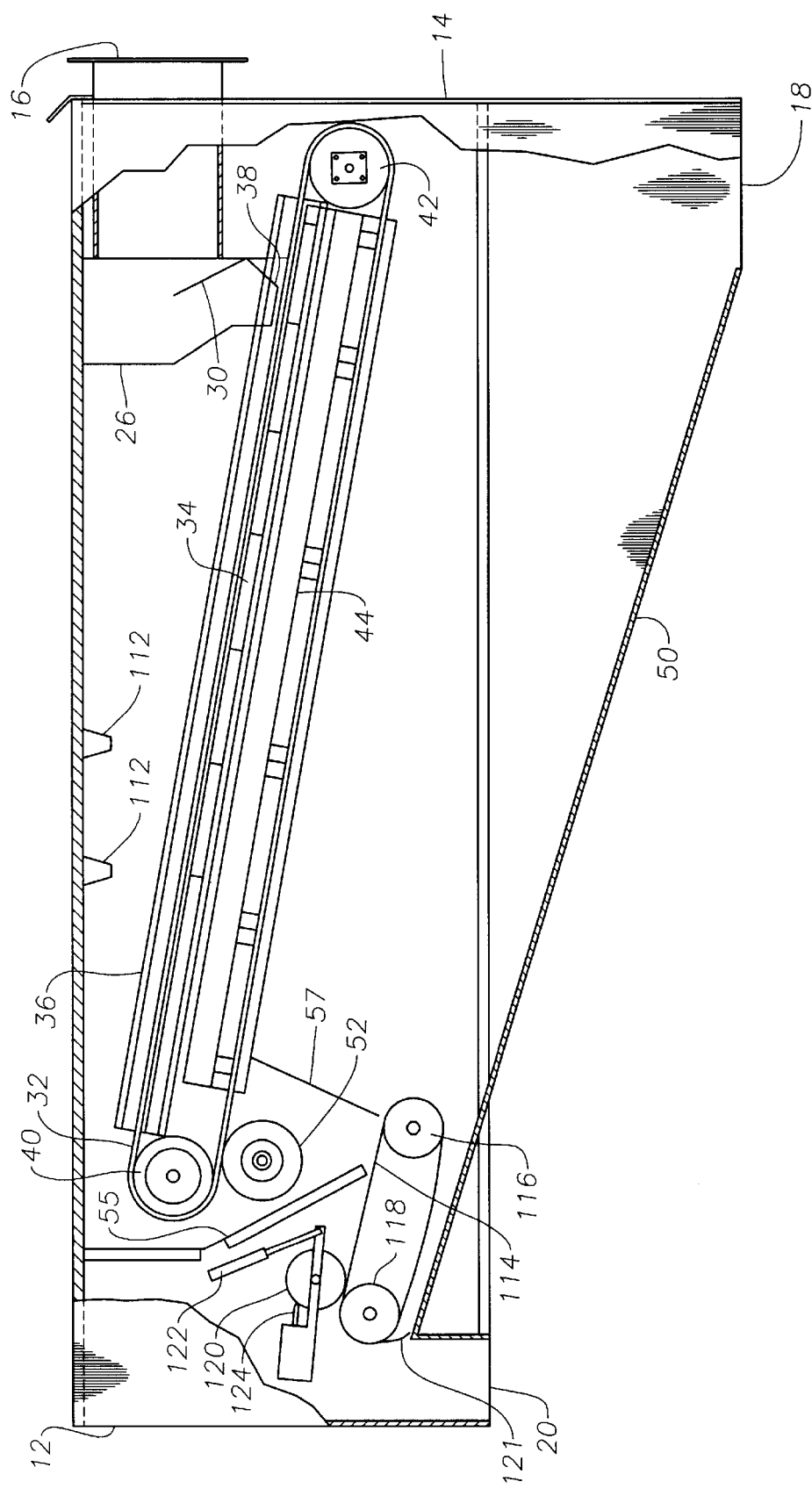
FIG. 9 shows a cross-sectional view of a municipal waste separator in accordance with a second embodiment of the present invention.

FIG. 9 shows an alternate embodiment of a municipal waste separator 110. Those components having functions similar to components of the municipal waste separator 10 shown in FIG. 1 are numbered identically, and are not specifically discussed here. Spray nozzles 112 are provided above the conveyor bed to wash slimes and small clinging particles from debris travelling up the inclined screening belt 32. The spray nozzles 112 may be apertures in a sealed manifold aimed to spray down at the surface of screen belt 32. One end of the manifold is connected to a supply hose which supplied the spray nozzles with water under a pressure of about 40 pounds per square inch. The washed debris travels over upper roller 40 and down debris incline 55. Debris incline 55 and splash plate 57 direct any debris or projected moisture from brush 52 down to press belt 114.

Press belt 114 is an endless belt that circulates between a drive roller 118 and an idler roller 116. Excess moisture drains from the washed debris through apertures in press belt 114, and pressure is applied to the debris by a pressure roller 120 to squeeze out additional moisture which also drains away through apertures in press belt 114. The pressed debris passes over drive roller 118 and falls to the debris outlet 20. Any debris clinging to press belt 114 is scraped away by scraper 121.

Pressure roller 120 is equipped with a biasing spring 122 and a scraper 124. Spring 122 presses the pressure roller 120 against belt 114 with sufficient force to squeeze excess water from the debris while avoiding damage to belt 114 or roller 120. Scraper 124 removes any clinging debris from pressure roller 120. In this manner, as much excess water as possible is removed from the debris to minimize the volume of the debris.

Press belt 114 is preferably constructed of polyester, nylon, polyethylene, polypropylene, or other materials as are known in the art. The mesh size of the press belt is preferably about the same as that of the fine screens 94. The thickness of press belt is preferably about 0.1 inches, and the width is preferably about 28 inches, although other dimensions are also contemplated.

The municipal waste separator apparatus and methods of the present invention have been described above with respect to applications involving the separation of debris and large particles form municipal wastewater. However, one skilled in the art will recognize that many other applications are possible without departing from the scope of the invention. For example, many applications of the invention may be found in the mining and mineral and ore processing arts, where separation processes may be complicated by the rheopectic nature of one or more of the process streams or process stream components. Such applications of the apparatus and methods fo the present invention are specifically contemplated hereby as being within the scope of the above description of the present invention.

The foregoing descriptions are directed to particular embodiments of the invention for the purpose of illustration and explanation. It will be apparent, however, to one skilled in the art that many modifications and changes to the embodiments set forth above are possible without departing form the scope and the spirit of the invention. It is intended that the following claims be interpreted to embrace all such changes and modifications.

We claim:

1. A municipal waste separator comprising:
   an inlet configured to receive debris-laden wastewater;
   an inclined screening belt which passes over an upper roller and a lower roller, wherein said screening belt has a plurality of apertures through which a substantial portion of the wastewater passes, and wherein said screening belt conveys debris which does not pass through the apertures over the upper roller; and
   a puddle will configured to retain a puddle of debris-laden wastewater on an upper surface of the inclined screening belt near the lower roller, wherein said puddle creates a head of fluid sufficient to assist in forcing wastewater through the screening belt.

2. The municipal waste separator of claim 1, further comprising:
   a debris discharge outlet through which debris passing over the upper roller is directed; and
   a belt cleaning brush which brushes clinging debris from the screening belt toward the debris discharge outlet.

3. The municipal waste separator of claim 2, further comprising:
   a deflector plate disposed above a return path of the screening belt, wherein the wastewater which passes through the inclined screening belt is deflected from the return path of the screening belt by the deflector plate, and wherein the deflected wastewater is subsequently directed through a wastewater discharge port.

4. The municipal waste separator of claim 3, further comprising:
   overflow ports which allow wastewater from the puddle to bypass the inclined screening belt if the inclined screening belt becomes blinded, whereby the wastewater is substantially prevented from exiting the municipal waste separator via the debris discharge outlet.

5. The municipal waste separator of claim 3, further comprising:
   support rollers placed along the return path of the screening belt to reduce belt tension.

6. The municipal waste separator of claim 1, further comprising:
   a backing plate having perforations over which the inclined screening belt passes from the lower roller to the upper roller, wherein the backing plate includes wear strips mounted on an upper surface.

7. The municipal waste separator of claim 1, wherein the inclined screening belt includes:
   a backing belt with a high wear resistance, wherein the backing layer includes one or more attachment seams; and
   one or more fine screens, wherein each fine screen is attached along two edges to the backing belt, wherein the two edges are each secured to the backing belt by one of the one or more attachment seams.

8. The municipal waste separator of claim 6, wherein the fine screens are individually replaceable.

9. The municipal waste separator of claim 6, wherein exactly two fine screens are included.

10. The municipal waste separator of claim 6, wherein the upper roller includes a toothed sprocket with teeth that engage the backing belt and thereby assure belt alignment.

11. The municipal waste separator of claim 2, wherein said belt cleaning brush includes bristle tips, said bristle tips having a velocity of approximately that of twice said screening belt.

12. The municipal waste separator of claim 11, wherein said upper roller has a first outside diameter and said belt cleaning brush has a second outside diameter, said first and second outside diameters being approximately equal.

13. The municipal waster separator of claim 1, wherein said screen belt may be selectively varied from about 500 to about 3000 inches per minute.

14. A method for screening debris from a stream of debris-laden municipal wastewater, wherein the method comprising:
   forming a puddle of debris-laden wastewater on an upper surface of an inclined screening belt having a plurality of apertures through which a substantial portion of the wastewater passes, wherein said puddle creates a head of fluid sufficient to assist in forcing wastewater through the apertures in the screening belt;
   moving the inclined screening belt in a continuous path around an upper roller and a lower roller so that debris deposited on the inclined screening belt is conveyed up to an over the upper roller; and
   passing debris which falls from the screening belt through a debris discharge outlet.

15. The method of claim 14, further comprising:
   brushing clinging debris from the screening belt toward the debris discharge outlet.

16. The method of claim 15, further comprising:
   deflecting wastewater which passes through the apertures in the inclined screening belt form a return path of the inclined screening belt.

17. The method of claim 16, further comprising:
   directing wastewater through bypass ports if the inclined screening belt becomes blinded, thereby preventing wastewater from passing through the debris discharge outlet.

18. A municipal waste separator comprising:
   an inlet configured to receive debris-laden wastewater;
   an inclined screening belt which passes over an upper roller and a lower roller, wherein said screening belt has a plurality of apertures through which a substantial portion of the wastewater passes, and wherein said screening belt conveys over the upper roller debris which does not pass through the apertures; and
   an inclined press belt which passes continuously over a drive roller and an idler roller,
   wherein said press belt has a plurality of apertures through which excess water passes, and wherein said press belt receives said debris conveyed by the screening belt; and a press roller which squeeze excess water from debris received on the press belt as the press belt conveys the debris toward the drive roller.

19. The municipal waste separator of claim 18, further comprising:
   a scraper which removes clinging debris from the inclined press belt.

* * * * *